June 18, 1929.  F. J. CURRAN  1,717,667
FURNACE
Filed July 31, 1926
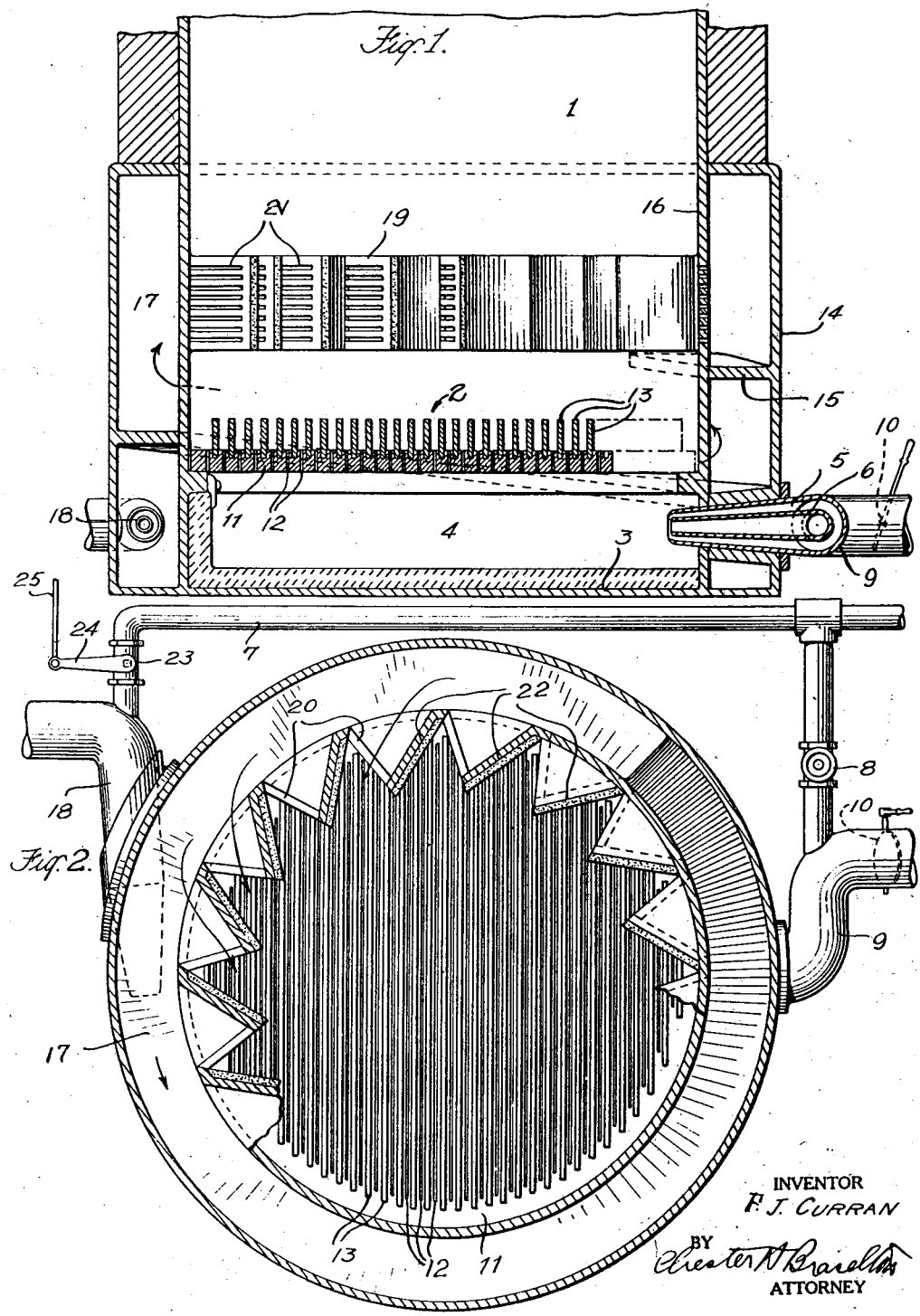
INVENTOR
F. J. CURRAN
BY
ATTORNEY Patented June 18, 1929.

1,717,667

UNITED STATES PATENT OFFICE.

FRANK J. CURRAN, OF NEW YORK, N. Y., ASSIGNOR TO STEAM PRODUCTION CORPORATION, A CORPORATION OF DELAWARE.

FURNACE.

Application filed July 31, 1926. Serial No. 126,305.

This invention relates to furnaces for the production of steam for the heating of dwellings and office space and the like, for supply of energy to automobiles and other automotive vehicles and in general for the transfer of energy involving the combustion of liquids or gases. Furnaces heretofore have been in use utilizing crude oil or kerosene or other petroleum products as a source of energy, but the full amount of heat content of the fuel has not been utilized.

One important object of the present invention, is to provide means for converting the fuel into heat energy in a thorough and efficient manner, thus producing a maximum amount of heat for a minimum quantity of fuel.

Another object of the invention is to provide means for utilizing the direction of flow of the gases in the furnace to bring about a churning or mixing thereof whereby the fuel vapors and the air are thoroughly mixed and in such a way as to produce approximately complete combustion of the hydrocarbons.

Other objects of the invention pertain to means for eliminating hissing or whistling of the gases, to provide a heating arrangement which is highly satisfactory for steam production, to provide means which are capable of use with a high degree of efficiency on automotive vehicles, such as automobiles, and in general to provide a type of furnace that is simple, inexpensive, efficient and satisfactory for general heating purposes.

The invention may be more fully understood from the following description in connection with the accompanying drawing, wherein:

Figure 1 is an elevation, partly in section showing the relative arrangement of the primary and auxiliary combustion means; and Figure 2 is a fragmentary plan-view partly in section showing the relative position of the primary and auxiliary inlet nozzles and the auxiliary admission slots and impact blocks.

In the drawing 1 represents a circular furnace of the vertical type having a grate 2 spaced above the furnace bottom 3 to provide a combustible fuel receiving chamber 4. A fuel nozzle 5, having an admission tube 6 connected to a pressure supply line 7 through the usual manual regulating valve 8, by its action produces a suction and a consequent flow of air through air supply pipe 9, controlled by means of a manually operated damper 10. The pressure on the fuel line best suited for economical and efficient operation has been determined to be not less than 160 pounds and not more than 250 pounds. The grate 2 is formed of a plurality of refractory rectangular blocks or bars 11 spaced apart to provide slots 12 for the upward passage of a combustible mixture from the receiving chamber 4. Each block has an inset vertical radiant bar 13 to provide a heat retaining surface and permit proper ignition of the combustible mixture.

One feature of my invention is the utilization of an auxiliary combustion device. The lower portion of generator 1 has an enclosing spaced wall 14, flanges 15 combining with the cylindrical wall 16 of the combustion chamber and the enclosing wall 14 to form a helical heating chamber 17 around the combustion chamber into which auxiliary combustible mixture enters through nozzle 18, and is caused to traverse a tortuous path around the combustion chamber. The upper portion of wall 16 above the fire box is covered with the usual lagging. The nozzle 18 tangentially enters the heating chamber and is similar in construction to the main supply nozzle 5.

The auxiliary mixture, after moving upwardly through the helical heating chamber 17 passes into the combustion chamber through a horizontally positioned iron frame-work 19. This frame work is rigidly secured to the combustion chamber wall 16 by riveting or other means, and is of stepped or toothed formation, each step 20 having a plurality of longitudinal slots 21 serving as admission ports for the auxiliary mixture in heating chamber 17. Refractory blocks 22 are vertically positioned in opposing relation to the steps 20 and are supported within the frame-work 19 at an angle or incline to the cylindrical wall 16 of approximately 45°. The incoming gas mixture from chamber 17 therefore enters through horizontal slots 21, impacts on blocks 22, and is caused to enter the combustion chamber in a whirling horizontal mass, which thoroughly combines with the primary burning mixture.

The blocks 22 are heated to a white heat by the combustion gas, thus insuring ignition of the auxiliary mixture. The use of an auxiliary chamber, and the resultant combining of the horizontal whirling mass of combustion gas with the vertically ascending burning gases from the grate produce practically instantaneous and complete combustion and eliminates all hissing or whistling.

An important feature of my invention is the control of the auxiliary combustion in accordance with variations in the steam demand and consequent variation in steam pressure. The auxiliary fuel inlet valve 23 is operatively connected, through the usual control arm 24 and control rod 25 with any well known type of pressure regulator positioned either in the steam space of the boiler or in the steam outlet pipe as desired. Variation in steam pressure will thus control combustion by regulating the flow of gas through the auxiliary gas inlet valve 23.

The operation of the apparatus may be summarized as follows:

Combustible mixture enters beneath the grate 2 through the nozzle 5, and passes upwardly through slots 12, being ignited by highly heated radiants 13. Auxiliary combustible mixture enters through nozzle 18, the amount of fuel supplied being regulated by valves 23 in accordance with steam pressure variations, and passes through the helical chamber 17 absorbing heat from the combustion chamber. The heated auxiliary fuel enters the combustion chamber through slots 21 and impacts on the angularly disposed and highly heated refractory blocks 22 becoming ignited thereby and whirls into the combustion chamber as a horizontal layer of burning gases which intimately mixes with the vertically ascending burning gases from the grate 2.

The effect of this combined vertical and horizontal movement of burning gases, combining centrifugal and direct gas movement is to produce a thorough mixing up of the fuel and air resulting in a very intense heat which makes possible a reduction in the size of the furnace necessary to produce a given heating effect. This furnace construction consequently is of highest value in connection with automotive vehicles where economy of space is a primary factor.

While the invention has been described as formed of a main fuel distributing inlet and an auxiliary separate heating inlet, it is of course, apparent that the auxiliary inlet may be combined with the main inlet and receive fuel and air from the same source or nozzle. In other words, the gratings 13 and 21 may be combined and coincidentally the distributing area 4 and 17 may be combined so that from the same source gases flow into the combustion chamber both from the base and also from the side to produce vertical and horizontal inflow of gases, and thus bring about the mixing of the gaseous elements so desirable in producing the high heating effects.

Various other modifications other than those mentioned or described may be made by those skilled in the art to which this invention pertains, and accordingly I do not desire to be limited by the specific embodiments herein shown, my invention covering all modifications coming within the scope of the claims hereto appended.

Having thus described my invention, what I claim as new is:

1. In a furnace, a grate having fuel passages therein; a combustion chamber above the grate; a fuel inlet leading into the furnace beneath the grate; auxiliary inlet passages above the grate for additional fuel admission to the combustion chamber, said passages being disposed so as to provide whirling motion of the gases therein; and fuel supply means for the auxiliary inlet passages.

2. In a furnace, a horizontal grate having fuel passages therein; a combustion chamber above the grate; a fuel inlet leading into the furnace beneath the grate; horizontal auxiliary inlet passages spaced around the combustion chamber and disposed so as to provide whirling motion of the gases therein; and fuel supply means for the auxiliary inlet passages.

3. In a furnace, a grate having fuel passages therein; a combustion chamber above the grate; a fuel inlet leading into the furnace beneath the grate; auxiliary inlet passages for additional fuel admission to the combustion chamber, said auxiliary passages being angularly disposed around the combustion chamber to create a whirling entry of the auxiliary fuel; and fuel supply means for the auxiliary inlet passages.

4. In a furnace, a grate having fuel passages therein; a combustion chamber above the grate; horizontal auxiliary inlet passages for additional fuel admission to the combustion chamber; said auxiliary passages being angularly disposed around the combustion chamber to create a whirling entry of the auxiliary fuel; and fuel supply means for the auxiliary passages.

5. In a furnace, a grate having fuel passages therein; a combustion chamber above the grate; a fuel inlet leading into the furnace beneath the grate; auxiliary inlet passages for additional fuel admission into the combustion chamber; deflector plates for receiving the impact of the auxiliary fuel when entering the combustion chamber; and fuel supply means for the auxiliary inlet passages.

6. In a furnace, a grate having fuel passages therein; a combustion chamber above the grate; a fuel inlet leading into the furnace beneath the grate; auxiliary inlet passages spaced around the combustion chamber for additional fuel admission, said auxiliary passages being angularly disposed around the combustion chamber; deflector plates positioned opposite the angularly disposed inlet passages for receiving the impact of the auxiliary fuel when entering the combustion chamber; and fuel supply means for the auxiliary inlet passages.

7. In a furnace, a grate having fuel passages therein; a combustion chamber above the grate; a fuel inlet leading into the furnace beneath the grate; auxiliary inlet passages for additional fuel admission into the combustion chamber; an auxiliary fuel supply conduit around the combustion chamber in heat absorbing relation thereto; and fuel supply means for the conduit.

8. In a furnace, a grate having fuel passages therein; a combustion chamber above the grate; a fuel inlet leading into the furnace beneath the grate; auxiliary inlet passages spaced around the combustion chamber for additional fuel admission to the combustion chamber· an auxiliary fuel supply conduit around the combustion chamber in heat absorbing relation thereto; and fuel supply means for the conduit.

9. In a furnace, a grate having fuel passages therein; a combustion chamber above the grate; a fuel inlet leading into the furnace beneath the grate; auxiliary inlet passages for additional fuel admission to the combustion chamber; said passages being angularly disposed around the combustion chamber to create a whirling entry of the auxiliary fuel; an auxiliary fuel supply conduit around the combustion chamber in heat absorbing relation thereto; and fuel supply means for the conduit.

10. In a furnace, a grate having fuel passages therein; a combustion chamber above the grate; a fuel inlet leading into the furnace beneath the grate; auxiliary inlet passages for additional fuel admission to the combustion chamber, said passages being so disposed as to provide whirling motion of the gases in said chamber; fuel supply means for said auxiliary inlet passages; and mechanism for regulating said auxiliary fuel supply means.

11. In a grate for a furnace, spaced grate bars providing passages for fuel; and radiants extending substantially the length of said bars embedded therein and projecting above the grate surface.

12. In a furnace, the combination of a grate having fuel passages therein; a combustion chamber above the grate; a fuel inlet leading into the furnace beneath the grate; and means for producing a circumferential flow of gases entering the furnace above the grate comprising auxiliary inlet passages for additional fuel admission to the combustion chamber above said grate.

13. In a furnace, the combination of an approximately horizontal grate having fuel passages therein; a grate in the wall of said furnace above said horizontal grate having horizontal passages therein so disposed as to produce whirling motion of the gases above said horizontal grate; and means for supplying fuel gases to each of said grates whereby a combined vertical and horizontal inflow of gases into the combustion chamber defined by said grates providing whirling motion is produced.

14. In a furnace, the combination of a cylindrical furnace wall; a horizontal grate positioned in the base thereof having vertical gas inlets formed therein; and an annular grate positioned above said horizontal grate and having inlets formed therein which are inclined in a uniform direction from the axis of the furnace whereby a circumferential movement of gases coming into the chamber is produced.

In testimony whereof, I affix my signature.

FRANK J. CURRAN.